United States Patent
Lei et al.

(10) Patent No.: US 6,915,019 B2
(45) Date of Patent: Jul. 5, 2005

(54) METHOD FOR COMBINING VECTOR-QUANTIZATION DECODING WITH COLOR TRANSFORM OR HALFTONING OR BOTH

(75) Inventors: Shawmin Lei, Camas, WA (US); Renjit Tom Thomas, Vancouver, WA (US); Uoc Nguyen, Long Beach, CA (US); Chingwei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 694 days.

(21) Appl. No.: 09/823,497

(22) Filed: Mar. 30, 2001

(65) Prior Publication Data

US 2002/0164073 A1 Nov. 7, 2002

(51) Int. Cl.[7] .............................. G06K 9/38; G06K 9/36
(52) U.S. Cl. ........................ 382/253; 382/233
(58) Field of Search ................. 382/162, 164, 382/165, 166, 232, 233, 235, 251, 253; 358/501, 515, 523; 375/240.03, 240.1, 240.16, 240.22, 240.24

(56) References Cited

U.S. PATENT DOCUMENTS

| 4,797,739 | A | * | 1/1989 | Tanaka ..................... 348/418.1 |
| 5,341,441 | A | * | 8/1994 | Maeda et al. ................ 382/253 |
| 5,414,527 | A | * | 5/1995 | Koshi et al. ................ 382/239 |
| 5,751,856 | A | * | 5/1998 | Hirabayashi ................ 382/232 |
| 6,072,910 | A | * | 6/2000 | Maeda et al. ................ 382/253 |
| 6,252,994 | B1 | * | 6/2001 | Nafarieh ...................... 382/253 |
| 6,356,654 | B1 | * | 3/2002 | Loce et al. .................. 382/162 |
| 6,587,222 | B2 | * | 7/2003 | Nishikawa ................... 358/1.9 |

FOREIGN PATENT DOCUMENTS

| JP | 03253175 | 2/1990 | ............ H04N/1/41 |
| JP | 11025255 | 6/1997 | ............ G06M/1/00 |

OTHER PUBLICATIONS

Martins et al. (lossless, near–lossless, and refinement coding of bilevel images, May 1999 IEEE, vol. 8, No. 5).*
Dujmic et al. (inverse error diffusion using table look–up and vector quantization, 2000 IEEE).*
R. A. Vander Kam, P. A. Chou, R. M. Gray; *Performance Evaluation of Greedy Search Algorithms for Image Halftoning and Compression*, 1993, Conference Record of The Twenty–Seventh Asilomar Conference on signals, Systems and Computers, vol. 2, pp. 951–955; (15 pages).
R. A. Vander Kam, P.A. Chou, E.A. Riskin, R.M. Gray; *An Algorithm for Joint Vector Quantizer and Halftoner Design*; IEEE International Conference on Acoustics, Speech, and Signal Processing, pp. 1–5.
R. A. Vander Kam, P. A. Chou, R. M. Gray; *Combined Halftoning and Entropy–Constrained Vector Quantization*; SID 93 Digest ©Society for Information Display, 1993; pp. 1–4.

* cited by examiner

*Primary Examiner*—Andrew W. Johns
*Assistant Examiner*—Amir Alavi
(74) *Attorney, Agent, or Firm*—Marger Johnson & McCollom, P.C.

(57) ABSTRACT

A method of decompressing image data, includes reception of a VQ encoded image. The received image is decoded. Output image color space processing is performed in combination with the decoding as one process. Output image color space processing may include color transformation, half-toning or both. The resulting output image has been both decoded and transformed in color space.

12 Claims, 3 Drawing Sheets

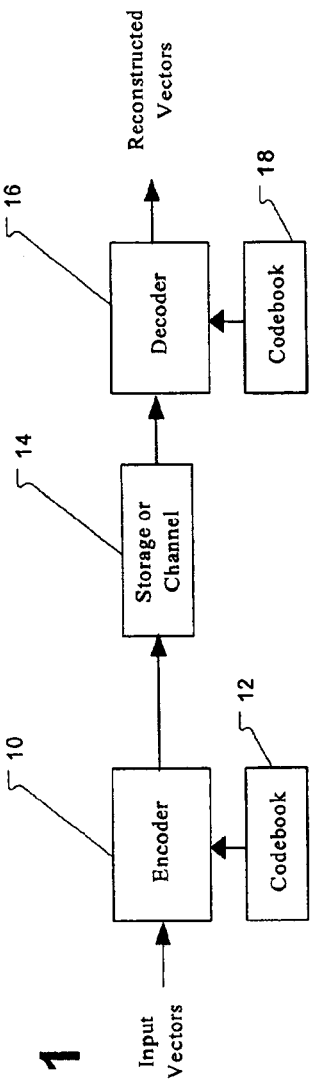
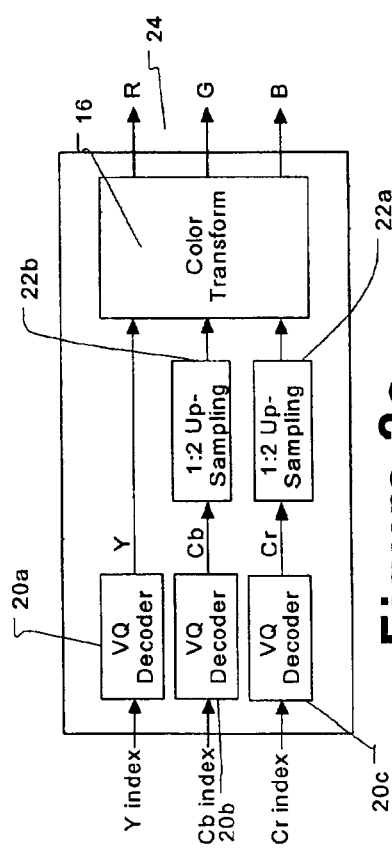
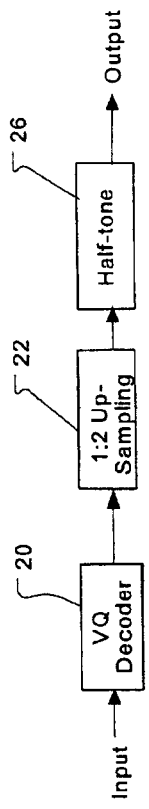
Figure 1
Figure 2a
Figure 2b

METHOD FOR COMBINING VECTOR-QUANTIZATION DECODING WITH COLOR TRANSFORM OR HALFTONING OR BOTH

BACKGROUND

1. Field

This invention relates to image compression and reproduction, more particularly to image compression and reproduction in color reproduction devices.

2. Background

Image compression techniques allow image data to be transmitted or stored more efficiently, as the compressed image requires less space or lower bandwidth to be transmitted than the uncompressed image. Generally, color images can be compressed more efficiently in the luminance-chrominance color space (YCbCr) than in other color spaces, such as red-green-blue (RGB) or cyan-magenta-yellow-black (CMYK). However, output devices such as displays and printers usually require the image data to be in either RGB or CMYK format. This requires a process to convert between the compression color space and the output color space, referred to as color transformation.

Further a printer may also require that an image be half-toned in order to show more perceptible contrast levels than the print engine can actually print. This may also be true of displays with limited bit-depth, such as those used in personal digital assistants (PDAs). Some of those types of display only use 4 or 5 bits of display data per color, rather than the 8 bits used in typical large displays.

These processes can be done in several different ways. However, a method of image compression referred to as vector quantization (VQ) uses a look up table to compress and decompress the image. Similarly, both the color transformation and half-toning can use look up tables to manipulate the data appropriately.

Some work has taken advantage of these facts and proposed using half-toning and compression in a VQ encoder. However, no one has addressed this type of process in the decoder.

SUMMARY

One aspect of the disclosure is a method of decompressing image data. A VQ encoded image is received and decoded. Output image color space processing is performed in conjunction with the decoding. Output image color space processing may include color transformation, half-toning or both. The method may be implemented by execution of machine-readable code, or by a decoder. The decoder may comprise at least one input path, a processor, a lookup table and at least one output path. The processor is operable to receive encoded data values through the input paths and looks up the appropriate output values from the lookup table. The output value is then transmitted along one of the output paths.

BRIEF DESCRIPTION OF THE DRAWINGS

The invention may be best understood by reading the disclosure with reference to the drawings, wherein:

FIG. 1 shows an embodiment of a VQ encoder/decoder system.

FIGS. 2a and 2b show embodiments of a VQ decoder in accordance with the invention.

DETAILED DESCRIPTION OF THE EMBODIMENTS

Figure 3:
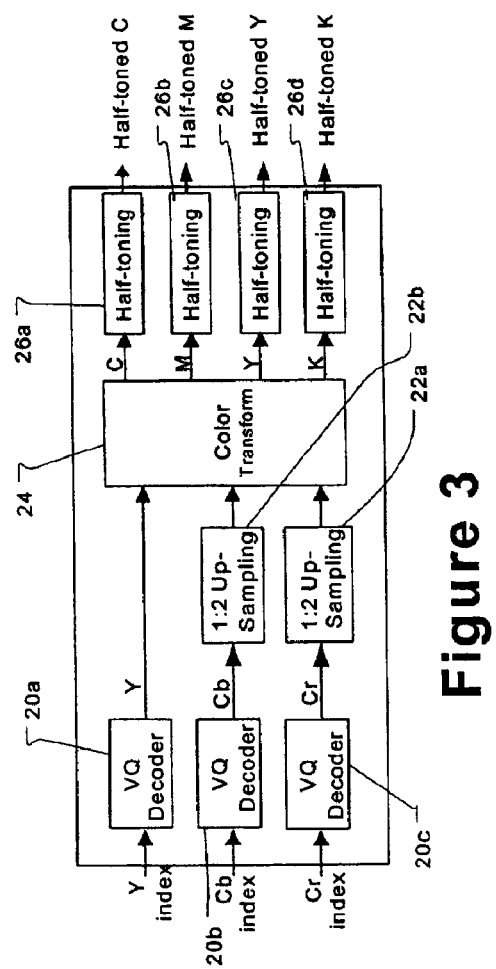
FIG. 3 shows an alternative embodiment of a VQ decoder in accordance with the invention.

In this invention, using vector quantization (VQ) as the compression method, one can combine VQ decoding with color transform and/or half-toning into one table-look-up operation. It can speed up the whole process and eliminate any need for buffers between either two merged steps. This approach differs from the prior art by a combination of not only VQ and halftone, but also color transform, in decoders, not in encoders. This process allows the VQ compression to be performed in the most efficient color space for compression, e.g., YCbCr, but still allow directly outputting the pixels in the color space and the possible halftone format demanded by the output devices.

The discussion will first briefly introduce vector quantization (VQ), color transform, and half-tone. It will then describe the combination of VQ decoding with color transform and/or half-toning.

Vector quantization is one of the popular compression algorithms, which can be applied to both speech compression and image compression. It is generalized from scalar quantization to the quantization of a multi-dimensional vector, an ordered set of real numbers. The jump from one dimension to multiple dimensions is a major step that allows many new ideas, concepts, techniques, and applications.

A vector can be used to represent any type of ordered data, such as a segment of a sampled speech waveform or a block of image pixels. Vector quantization can be viewed as a form of pattern recognition where an input vector is "approximated" by one of a predetermined set of standard patterns, or in other words, the input vector is matched with one of a stored set of templates or codewords. This predetermined or stored set of patterns, templates, or codewords is called codebook. In compression applications, the index of the matched pattern in the codebook is stored or transmitted. This index may or may not be compressed by some lossless compression methods, e.g., Huffman coding. When a decoder receives the index, the decoder just looks up the corresponding pattern in the codebook and outputs the pattern as decoded results. Therefore, a VQ decoder usually has very low complexity and can be implemented by a single table-look-up operation for each reconstructed vector.

A VQ encoder is usually much more complex than the VQ decoder. A straightforward way to implement a VQ encoder can be a full search of the closest pattern in the codebook for each input vector, i.e., comparing the input vector with the codewords in the codebook one by one. Since the full-search VQ requires a lot of computations in the encoder, many efforts have been put on simplifying the encoder. For example, using the tree-search concept, a tree-structured VQ was developed. Dividing the vector into smaller subvectors, a hierarchical VQ (HVQ) was developed. Most of those simplifications are sub-optimal approaches, i.e., the matched codeword may not be the optimal one, but only a codeword close to the optimal one. A block diagram of VQ encoder and decoder are shown in FIG. 1.

The image data is converted into the appropriate input vectors and then encoded at encoder 10 using a codebook 12. The subsequently encoded data can then be placed in storage or transmitted along the channel 14. The decoder 16 will then convert the stored or transmitted compressed data to uncompressed data using the codebook 18. This results in the reconstructed image vectors.

Having discussed VQ encoding and decoding, the discussion now turns to color transformation. The conversion between two different color spaces usually can be represented by a linear transform. For example, the color conversion from the RGB space to the YCbCr space is achieved by the following equation, as an example:

$$\begin{bmatrix} Y \\ Cb \\ Cr \end{bmatrix} = \begin{bmatrix} 0.299 & 0.587 & 0.114 \\ -0.16874 & -0.33126 & 0.5 \\ 0.5 & -0.41869 & -0.08131 \end{bmatrix} \begin{bmatrix} R \\ G \\ B \end{bmatrix}$$

Its reverse transform is as follows:

$$\begin{bmatrix} R \\ G \\ B \end{bmatrix} = \begin{bmatrix} 1 & 0 & 1.402 \\ 1 & -0.3441 & -0.7141 \\ 1 & 1.772 & 0 \end{bmatrix} \begin{bmatrix} Y \\ Cb \\ Cr \end{bmatrix}$$

The RGB color space is usually used for the image capture and for CRT or LCD output displays. On the other hand, the YCbCr color space is often used for transmission or storage, where compression is often required. It is well known that, in the human visual system (HVS), the spatial bandwidth of the chrominance components (i.e., Cb and Cr here) is about only a half of the spatial bandwidth of the luminance component (i.e., Y here). Therefore, a simple but effective way to reduce the visual redundancy is 2:1 down-sampling the chrominance components both horizontally and vertically. This simple method reduces the amount of chrominance data to a quarter with very minor visual degradation.

Since most hardcopy output devices are in the CMYK color space, the color conversion between the CMYK color space and the RGB (or YCbCr) color space is of great importance. Here only the conversion from RGB to CMYK will be discussed, with the understanding that similar concepts apply to other color space conversions. The conversion from YCbCr to CMYK can be achieved by concatenating YCbCr-to-RGB and RGB-to-CMYK conversions. For the hardcopy output devices, one typically needs to convert the image representation into the CMYK color space before half-toning.

Theoretically, cyan (C), magenta (M), and yellow (Y) are complementary colors to red (R), green (G), and blue (B) respectively. K represents black. The basic conversion from RGB to CMYK is as follows:

$K=1-\max(R,G,B)$ $C=1-R-K$ $M=1-G-K$ $Y=1-B-K$ where the range of all numbers are assumed to be from 0 to 1.

However, in reality, their relationship is not so simple due to many reasons, such as imperfection of inks and color rendering devices. Further more, both RGB and CMYK spaces are device dependent color spaces, so a color calibration based on a particular output device is necessary. Based on different image contents as well as ink media and output device's characteristics, the black generation needs be adjusted. Overall, each component in CMYK is affected by all RGB values as described below:

$C=f_C(R,G,B)$ $M=f_M(R,G,B)$ $Y=f_Y(R,G,B)$ $K=f_K(R,G,B)$

The functions in the above 4 equations are usually nonlinear and device dependent. It can be implemented by a table-look-up with 3 inputs resulting in 4 outputs. In practice, in order to reduce the size of the table, not all the possible combinations of RGB are stored in the table, but only the outputs of equally spacing 11–16 values for each RGB component are stored in the table. For other values other than the stored points, interpolation is used to generate the required outputs.

Having discussed color transformation, the discussion now turns to half-toning. For most digital printers and copiers the output tone level is bi-level or multi-level which is usually less than 256 levels. Therefore, they cannot directly reproduce the 8-bit per color images. Even for some 8-bit capable printers or copiers, the direct reproduction of 8-bit images will introduce a great amount of noises that makes the output quality unacceptable.

One way to resolve this problem is to use error diffusion process. Error diffusion turns on a pixel when the accumulated density level excesses a threshold level, and then diffuses the density error to the neighbors so that the neighborhood can represent an averaged local density. Turning on means to put toner on. Another solution that is much faster in process speed than the error diffusion is to group a certain amount of neighbor pixels to form a halftone cell. For example, for a bi-tonal printer, grouping a 16 by 16 area of pixels reproduces an average density for this area, then the system can display 256 levels by turning on certain amount of pixels. This technique is called half-toning and the group of output pixels is called a halftone dot.

The half-toning process also can average the random noises that come from the printing process. Therefore, for an 8-bit output device, although it can reproduce the input image pixel directly, 2 by 2 halftone cells are needed to average the noises and to make up the deficiency of 256-level reproduction capability.

Generally speaking, half-toning performs a many-to-one mapping from M×M pixels (e.g., 2×2 pixels), each with h bits (e.g., 8 bits), to N×N halftone cell (e.g., 2×2 cell), each with k bits (e.g., 8 bits). The M×M pixels will be referred to as the footprint of the half-toning hereafter.

Having discussed VQ encoding, color transformation and half-toning, the discussion now turns to an implementation that combines VQ decoding with color transformation as shown in FIGS. 2a and 2b. In these embodiments, the table-look-up for the VQ decoding with needed color transform in FIG. 2a and with the halftone in FIG. 2b into one single table-look-up.

The decoder 16 from FIG. 1 has been expanded to include one decoder 20a–20c each for the Y, Cb and Cr index inputs. As mentioned above, the Cb and Cr components are up-sampled 1:2 by up-sampling modules 22a and 22b. In FIG. 2a, these components then undergo color transformation at 24.

In FIG. 2b, the process either does not require color transformation or the color transformation has already been applied. For each output color, such as R, G, B, or C, M, Y, or K, the color is decoded at 20 and half-toned at 26. More than likely, any up sampling would have been performed during the color transformation, if that process was performed prior to decoding, or up sampling may not be necessary. However, if up sampling were integrated into this process, it would more than likely occur at 22. The path shown in FIG. 2b can be duplicated for however many output values there are, such as RGB or CMYK.

One advantage of performing this combination of VQ decoding and half-toning without the color transformation lies in the table size. If the codebook size for each component is designated as $S_i$, the table size for a combined table is $S_1 \times S_2 \times S_3$, to perform VQ decoding, color transformation and half-toning, as will be discussed in more detail further. However, performing just VQ decoding and half-toning, the table size would be $S_1 + S_2 + S_3$.

Regardless of whether the process is combined or separated by component, the decoder will comprise at least one input path, some sort of processor to receive an input value through the input path and to access a lookup table. The processor will then map the input value to the appropriate output value retrieved from the table and pass the output value to the next stage of the process. More than likely all of these components will reside on the decoder 16, with the decoder 20 acting as the processor.

Note that these combinations only affect the decoder. The combinations allows the compression to be performed in the most efficient color space, usually, the YCbCr or other similar color space, but still allows directly outputting the pixels in the color space and the possible halftone format demanded by the output devices. In this disclosure, it is assumed that the VQ compression is done in the YCbCr color space, with possible down sampling of the Cb and Cr components, but it can be in any color space, with or without down-sampling of the chrominance components.

First the combination of the VQ decoding with a color transform will be discussed. Here the output color space is assumed to be the RGB color space, which is used for CRT and LCD displays. However, the output color space can be any color space in general. FIG. 2a shows the VQ decoding and color transform in two sequential steps. The VQ decoder is usually just a table-look-up. The size of the codebook for Y, Cb, and Cr can be different. The output of the VQ decoder is a vector, one of the patterns in the codebook, specified by the index. The chrominance components, Cb and Cr, may have to be 1:2 up-sampled both horizontally and vertically.

In order to make the system simple, the vector footprints of Y, Cb, and Cr components should be the same, i.e., they correspond to the same image pixel. Thus, after the possible up sampling, the Y/Cb/Cr components corresponding to each image pixel are ready at the same time and can be fed into the color transform to convert them into the output color space, the RGB color space in the example here. As an example, use 2×4 as the footprint of the VQ for the Y component. The corresponding vector size for the down-sampled Cb or Cr component would be 1×2. For a set of 3 indices, the final output will be 2×4 R pixels, 2×4 G pixels, and 2×4 B pixels, totally 24 numbers. For each possible combination of Y/Cb/Cr indices, there are corresponding 2×4 R pixels, 2×4 G pixels, and 2×4 B pixels, totally a vector pattern of 24 numbers, which can be obtained by simply feeding the indices combination through the system. Thus, the whole system can be implemented by a table-look-up of a big table.

The number of entries in this big table is the product of the sizes of the Y/Cb/Cr codebooks. For example, if the sizes of the Y/Cb/Cr codebooks are 512, 64, and 64 respectively. The number of entries in the big table would be 2,097,152 (~2M). Each entry in the big table would have 24 numbers in this example.

For the hardcopy reproduction, the output color space usually is the CMYK color space and the half-toning is often required as the reasons were explained above. FIG. 3 shows an example of such system. In this case, the color transform takes Y/Cb/Cr (3) inputs and converts them into C/M/Y/K (4) outputs. Using the same 2×4 footprint of the VQ for the Y component as an example, the operations before the Color Transform are the same as in FIG. 2a and as described in the last paragraph. For a set of 3 indices of Y/Cb/Cr, the outputs of the Color Transform will be 2×4 C pixels, 2×4 M pixels, 2×4 Y pixels, and 2×4 K pixels, totally 32 numbers. The CMYK values then need to be half-toned. If the footprint of the half-toning is the same as the VQ vector footprint or is a subset of the VQ vector footprint, the half-toning can be done straightforward.

For example, if a 2×2 half-toning footprint is used with 8-bit output per pixel, a 2×4 input to the half-toning can be computed as 2 non-overlapped 2×2 half-toning cells. Thus, for each possible combination of Y/Cb/Cr indices, one can go through the whole system and obtain corresponding 2×4 half-toned pixels for each C/M/Y/K component, totally a vector pattern of 32 numbers. Thus, the whole system can be implemented by a table-look-up of a big table. The sizes of the Y/Cb/Cr codebooks are 512, 64, and 64 respectively, same as the example above. The number of entries in the big table would be 2,097,152 (~2M). Each entry in the big table would have 32 numbers for this case.

In general, VQ decoding can be combined with either color transform or half-toning, or can be combined with both color transform and half-toning into a single table-look-up as described above. If the footprint of the half-toning, if used, is same as VQ footprint or is a subset of the VQ footprint, the number of entries in the big table will not be affected by the half-toning. In the discussion of other embodiments, below, the cases when the VQ footprint is a subset of the half-toning footprint will be discussed.

Figure 4:
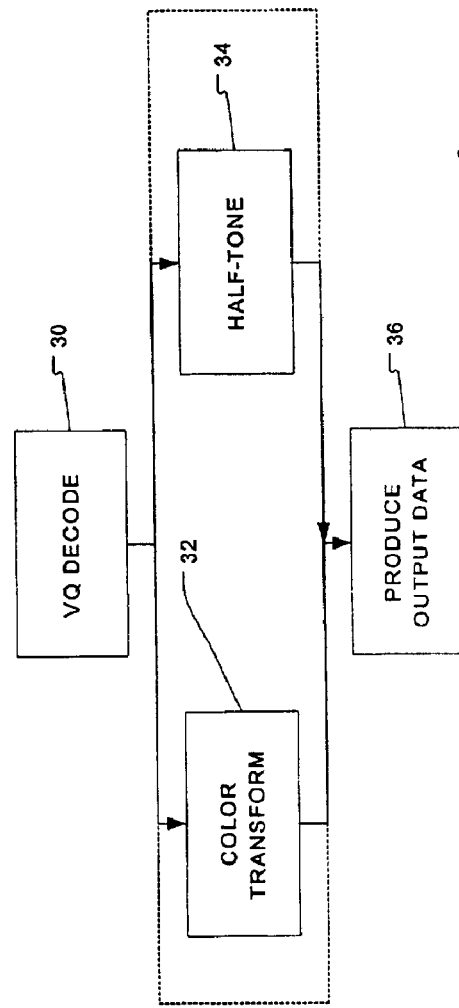
FIG. 4 shows a flowchart of one embodiment of a method for decompressing image data with image output color space processing.

For purposes of this discussion, the color transform process and the half-tone process will be referred to collectively as output image color space processing. A flowchart representation of one embodiment of the invention is shown in FIG. 4. At 30, the VQ decoding is done with the output image color space processing at 32. As mentioned above, these are shown sequentially, but may actually be performed simultaneously. The output image color space processing may be color transformation at 32, half-toning at 34 or both. The output image data is then produced at 36.

Application of the methods of the invention has resulted in some experimental results. Since the size of the "big" table is proportional to the product of the sizes of the Y/Cb/Cr codebooks, it is important to keep each codebook size small. In one experiment, a 3-stage HVQ was used to compress the Y component with 2×4 vector footprint and normal VQ to compress each down-sampled Cb and Cr component with 1×2 vector footprint. The resulting images were close to the original images.

Figure 5:
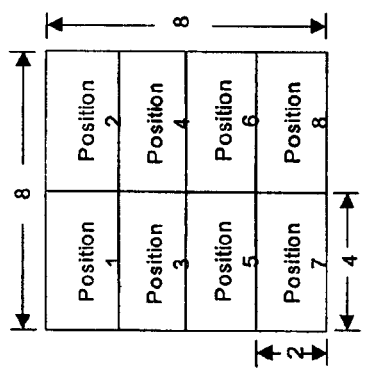
FIG. 5 show a graphical representation of a VQ encoding footprint relative to a half-toning footprint.

As mentioned before, if the VQ footprint is a subset of half-toning footprint, the combination of VQ decoding with color transform and half-toning can still work with multiple "big" tables, each for a different position of VQ vector within the half-toning footprint. For example, for a printer engine that takes 4 bits input, a larger half-toning cell may be needed. Assume a use of an 8×8 half-toning footprint as an example. If the VQ footprint is 2×4 as before, 8 VQ vectors will be fit into a half-toning footprint as shown in FIG. 5. In this case, in order to combine VQ decoding with color transform and half-toning into one table-look-up operation, 8 "big" tables need to be stored, one for each position, and switch the "big" table accordingly.

In another embodiment, the size of the VQ codebooks does not have to be a power-of-2 number. They can be any size. The discussion will denote the codebook sizes of the three compressed color components (Y/Cb/Cr in our example) as $S_1$, $S_2$, and $S_3$. The size of the "big" table would be $S_1 \times S_2 \times S_3$. When these 3 codebook sizes are all power-of-2 numbers, the bits of 3 indices specifying the reconstructed code vectors can be simply congregated to form the address bits for the "big" table. For example, if the codebook sizes for Y/Cb/Cr are 512, 64, and 64 respectively, the indices for Y/Cb/Cr can be represented by 9 bits, 6 bits, and 6 bits respectively. These indices bits are congregated to form the 21 address bits for the "big" table.

Figure 6:
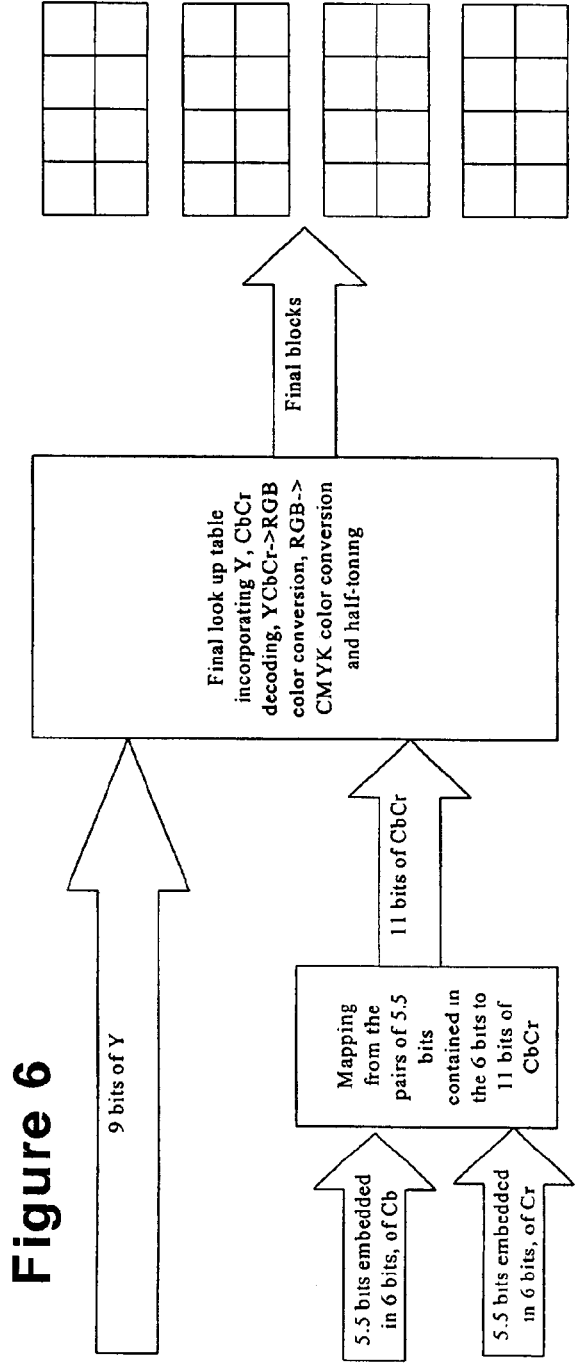
FIG. 6 shows an alternative embodiment of a VQ decoding process using a non-power-of-2 codebook.

If only one of the codebook sizes is not power-of-2, it will still simply congregate the indices bits to form the address bits for the "big" table, but in this case, not all possible addresses are used. If there are two non-power-of-2 codebook sizes, say $S_2$ and $S_3$, for efficient use of memory one needs to pack the indices, denoted as $I_2$ and $I_3$, into a new index $I_{2,3} = I_2 \times S_3 + I_3$. This new index $I_{2,3}$ can then be congregated with the other index to form the address bits. For example, if $S_2 = S_3 = 45$ ($= \lfloor 2^{5.5} \rfloor$), the new index $I_{2,3}$ can be represented by 11 bits with 23 addresses not used as shown in FIG. 6. In general, if none of the codebook sizes is power-of-2, the address index for the "big" table can be calculated by $$I = I_1 \times S_2 \times S_3 + I_2 \times S_3 + I_3.$$

In another embodiment, the VQ may compress a vector formed by data from multiple components. For example, for the 2×4 Y footprint in the previous example, the corresponding down-sampled 1×2 Cb data and 1×2 Cr data can form a 2×2 block that can be compressed by VQ. In this case, the combination of VQ decoding with color transform and/or halftone is straight-forward with only change that the number of input indices becomes 2, instead of 3.

In this manner, the VQ compression can be combined with color transformation and/or half-toning to streamline the decompression and image processing for output data. In some implementations of the invention, the methods of the invention will result from execution of instructions contained on an article in machine-readable form. The machine will read and execute the instructions that will cause it to perform the steps of the invention.

Thus, although there has been described to this point a particular embodiment for a method and apparatus for VQ decoding combined with output image color space processing, it is not intended that such specific references be considered as limitations upon the scope of this invention except in-so-far as set forth in the following claims.

What is claimed is:

1. A method of decompressing image data, the method comprising:

receiving a VQ encoded image encoded with a first codebook; and decoding the VQ encoded image, such that output image color space processing is performed in combination with the decoding, resulting in the decoding being performed with a second codebook.

2. The method of claim 1, wherein output image color space processing further comprises half-toning.

3. The method of claim 1, wherein output image color space processing further comprises color transformation.

4. The method of claim 1, wherein output image color space processing further comprises color transformation and half-toning.

5. The method of claim 1, wherein the VQ encoded image is in the luminance-chrominance color space.

6. The method of claim 1, wherein the output image color space processing produces RGB data.

7. The method of claim 1, wherein the output image color space processing produces CMYK data.

8. The method of claim 1, wherein the VQ encoded image is encoded with a first codebook that is not a power of 2.

9. The method of claim 1, wherein the VQ decoding footprint is a subset of the halftone footprint.

10. The method of claim 1, wherein the VQ encoded image is encoded through compression of a vector formed by data from multiple color components.

11. An article including instructions in machine-readable form that, when executed, cause the machine to:

receive a VQ encoded image;

decode the VQ encoded image, such that output image color space processing is performed in combination with the decoding, resulting in the decoding being performed with a second codebook.

12. A VQ decoder, comprising:

at least one input path operable to receive VQ-encoded data encoded with a first codebook;

a second codebook comprising a lookup table operable to provide output values for a given input value;

a processor operable to receive the VQ-encoded data and access the lookup table to acquire output values such that the output values are both decoded and color transformed using the second codebook; and at least one output path operable to allow the processor to transmit the output values for further processing.

* * * * *